UNITED STATES PATENT OFFICE.

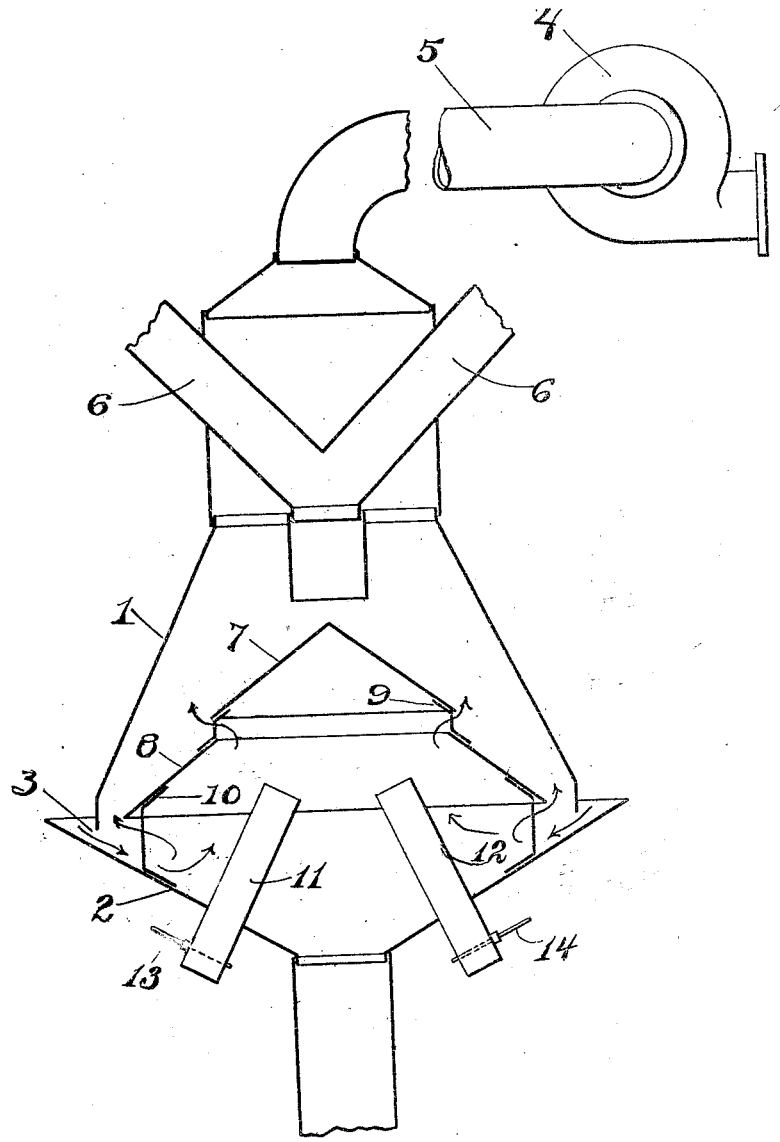

CHARLES ALLEN WRIGHT, OF CHICAGO, ILLINOIS.

GRAIN-CLEANER.

No. 884,552.

Specification of Letters Patent.

Patented April 14, 1908.

Application filed May 4, 1907. Serial No. 371,781.

*To all whom it may concern:*

Be it known that I, CHARLES ALLEN WRIGHT, a citizen of the United States, residing at Chicago, in the county of Cook and State of Illinois, have invented certain new and useful Improvements in Grain-Cleaners, of which the following is a specification.

My invention relates to grain cleaners and particularly to that type in which the grain is spread out and exposed to a cleaning blast of air. The invention has for its objects; to provide a cleaner of compact form wherein a more complete cleaning of the grain is secured than has heretofore been done; to increase the capacity of cleaners of a given size; and finally to provide a very compact apparatus wherein a repeated cleaning of the grain by the air blast is secured. One form of the invention is shown in the accompanying drawing, wherein—

The figure is a longitudinal section through the apparatus.

The construction hereinafter described constitutes an improvement on the structure shown in my pending application No. 306,200, and it will be found that the arrangement of parts is substantially the same with the exception of the means for introducing the air blast and spreader, which in the present device is so arranged as to secure a plurality of passages of the incoming blasts of air through the sheet of grain passing over the spreader.

The casing is composed of two parts, a hood 1, and a conical hopper 2, spaced apart at 3 whereby a blast of air transversely of the device is secured when air is exhausted from the upper part of the casing. The air is exhausted from the upper part of the casing by means of the usual fan 4 provided with pipe 5 leading to the upper portion of the casing, and grain is admitted opposite the spreader by means of the chute 6. The spreader which is disposed beneath the ends of the chute 6, comprises two parts, which may be termed respectively, the primary spreader, and the secondary spreader. The primary spreader 7 is of the usual conical type, and is supported from the secondary spreader 8 by means of straps 9, riveted to the two parts. The secondary spreader is in the form of a hollow truncated cone, and has its upper edge substantially below the lower edge of the primary spreader, and its lower edge just above the space 3 through which the air is admitted to the casing. The secondary spreader is supported by means of the straps 10. Pipes 11 and 12 having dampers 13 and 14 are provided for augmenting the draft of air between the spreaders 7 and 8. It will be seen from the foregoing that when grain is admitted upon the spreader, a double cleaning of the grain is secured, the one cleaning being by the air as it passes the lower edge of the secondary spreader 8, and the other cleaning by that portion of the air which passes up through the secondary spreader, and across the sheet of grain falling from the primary spreader to the secondary spreader. The annular space between the primary spreader and the secondary spreader also provides a means of escape for the chaff swept into the central portion of the casing by the blast of air from the opening 3 passing the grain as it falls from the lower edge of the secondary spreader. The construction thus provides for a double cleaning of the grain, and permits of a freer escape of the chaff collected in the spreader, than was possible where the old type of unitary spreader was used.

Having thus described my invention and illustrated its use, what I claim as new and desire to secure by Letters Patent is the following:—

1. In combination, in a grain cleaner, a casing having an opening for the admission of air intermediate its ends, a secondary spreader in the form of a hollow truncated cone with its lower edge adjacent the opening, a primary conical spreader with its lower edge in position to discharge grain upon the surface of the secondary spreader and spaced thereabove for the passage of air, an auxiliary air tube leading through the casing and beneath the spreaders for augmenting the draft between the spreaders, means for admitting grain upon the primary spreader and means for drawing air from the upper part of the casing.

2. In combination, in a grain cleaner, a casing having an opening for the admission of air, intermediate its ends, a secondary spreader with its edge adjacent the opening, a primary spreader with its outer edge in position to discharge grain upon the surface of the secondary spreader, and spaced thereabove for the passage of air, an auxiliary air tube leading to the casing and beneath the spreaders for augmenting the draft between the spreaders, means for admitting grain upon the primary spreader, and means for drawing air from the upper part of the casing.

In testimony whereof I have hereunto signed my name in the presence of the two subscribed witnesses.

CHARLES ALLEN WRIGHT.

Witnesses:
 PAUL CARPENTER,
 JAMES NICHOLAS LORENZ.